March 3, 1970    C. ENGELSMAN    3,497,959
APPARATUS FOR MAKING MEASUREMENTS AND COUNTING ITEMS
ON MAPS, DRAWINGS, AND THE LIKE
Filed June 9, 1967      4 Sheets-Sheet 1
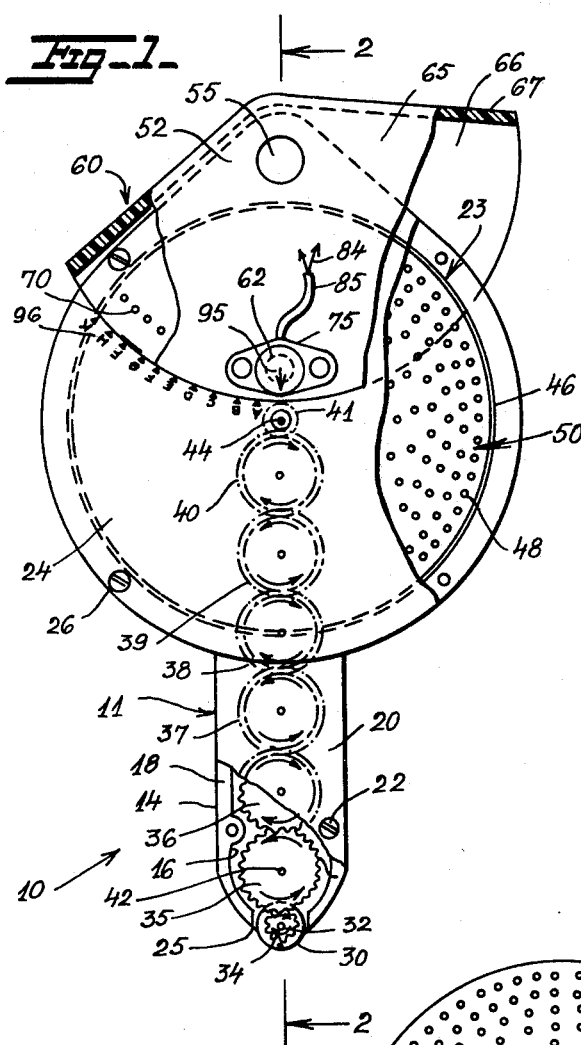
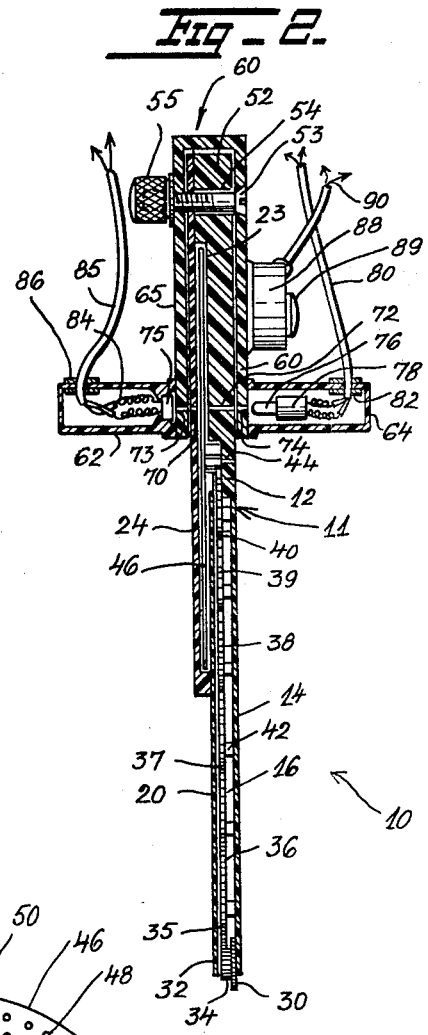
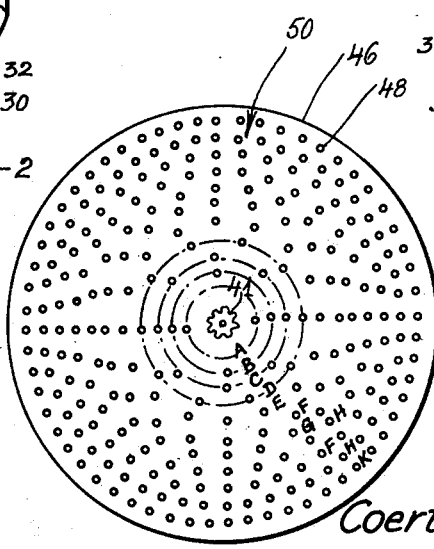
INVENTOR
Coert Engelsman
BY
Polachek & Saulsbury
ATTORNEYS March 3, 1970 C. ENGELSMAN 3,497,959
APPARATUS FOR MAKING MEASUREMENTS AND COUNTING ITEMS
ON MAPS, DRAWINGS, AND THE LIKE
Filed June 9, 1967 4 Sheets-Sheet 2
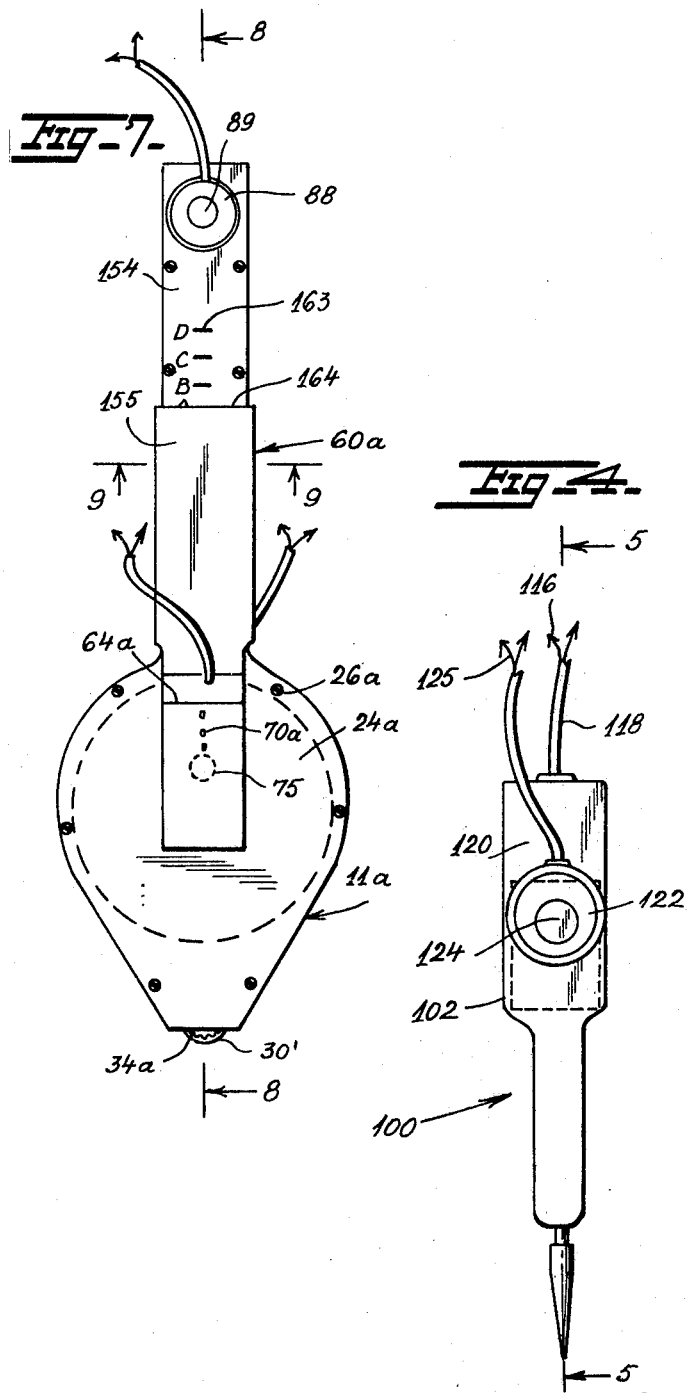
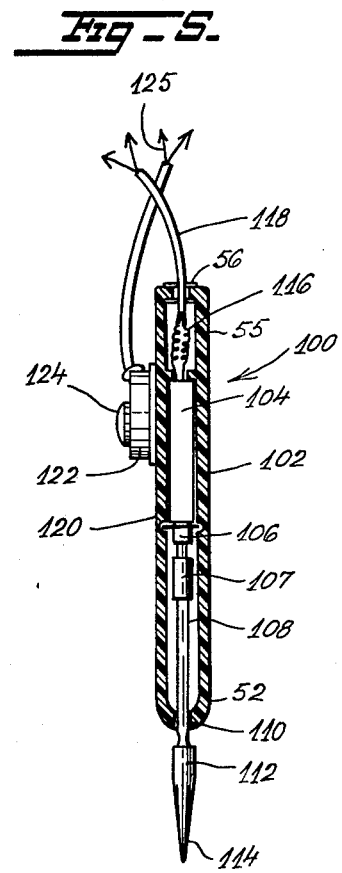
INVENTOR
Coert Engelsman
BY
*Polachek & Saulsbury*
ATTORNEYS

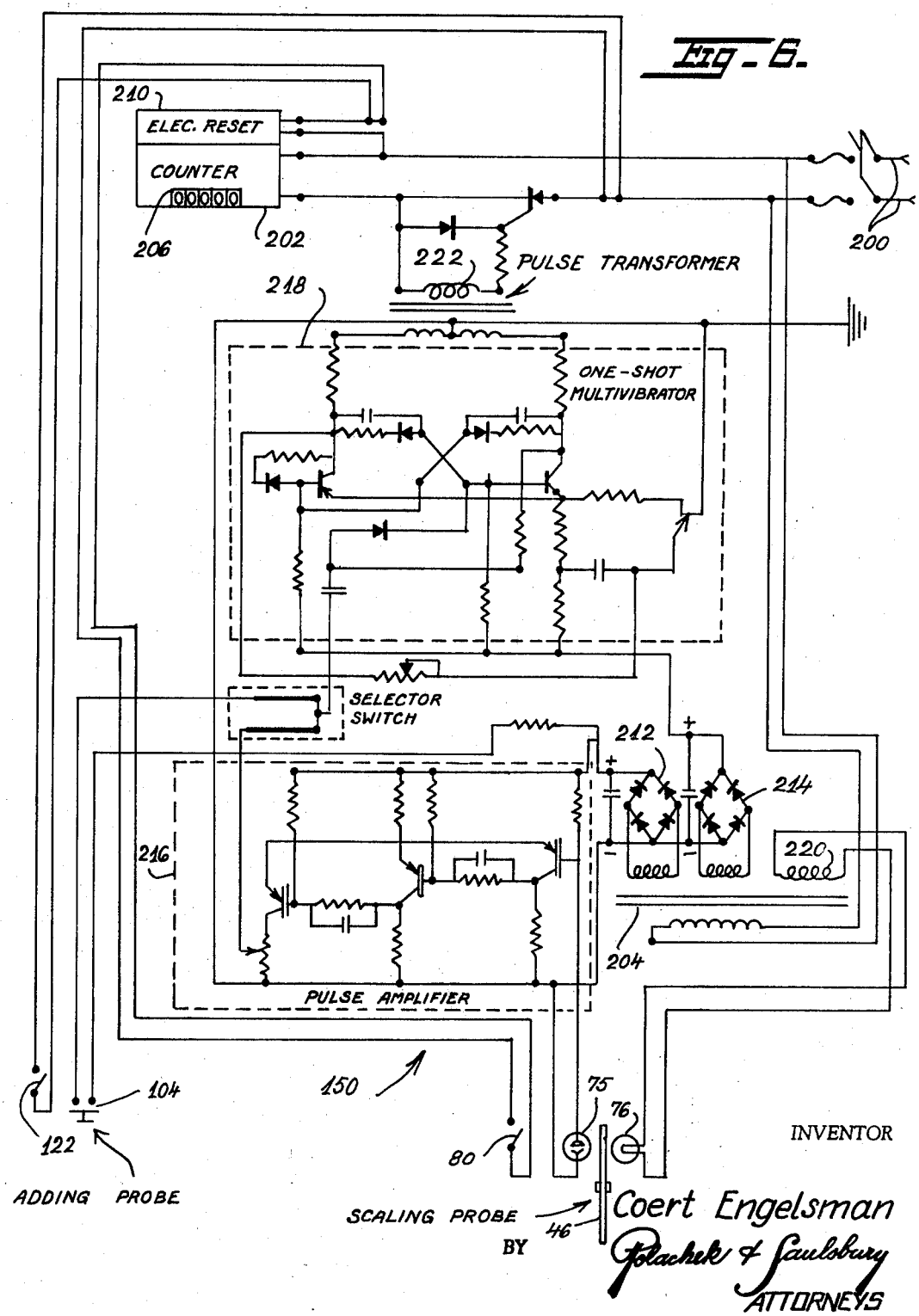

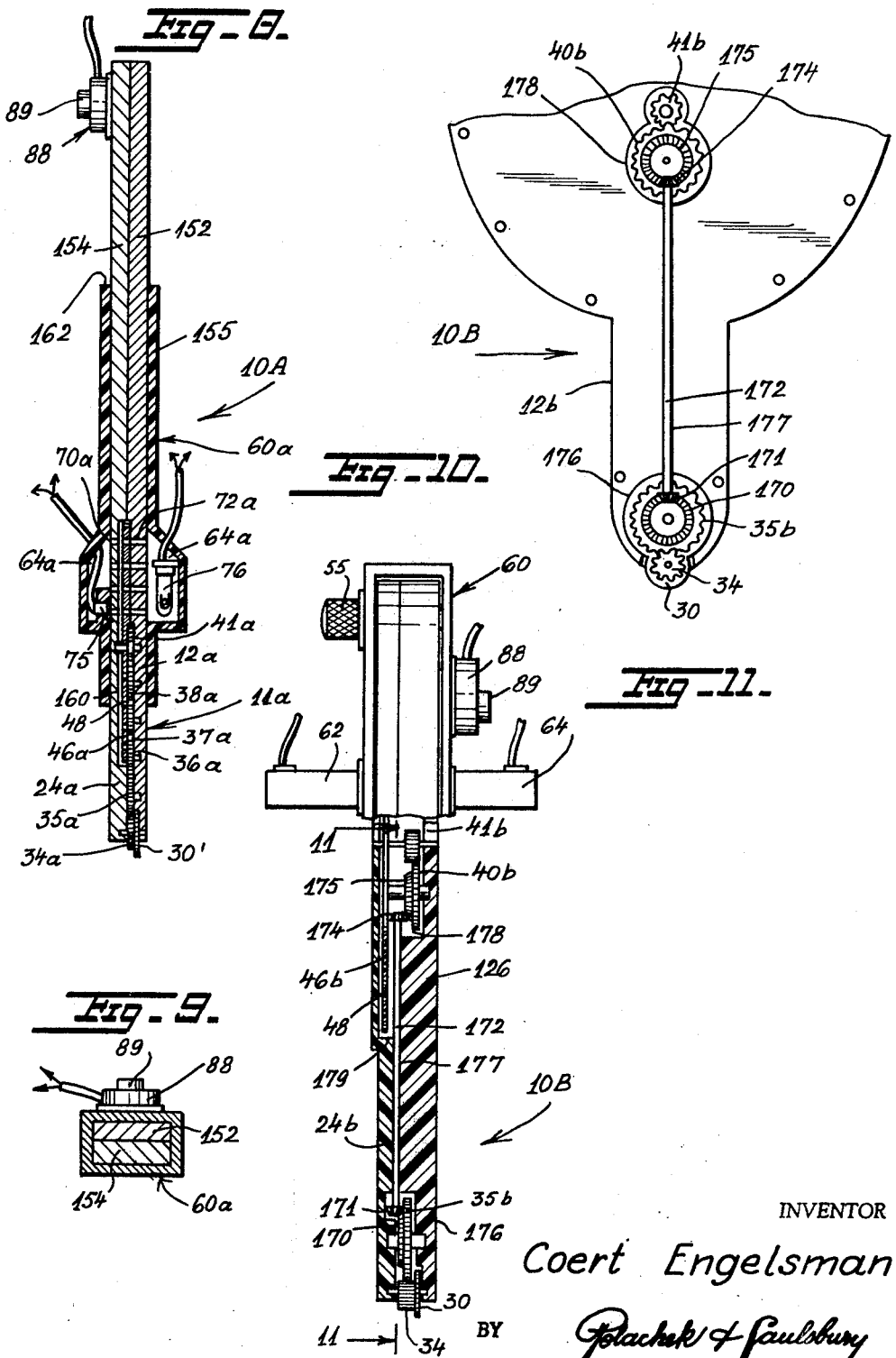

United States Patent Office 3,497,959
Patented Mar. 3, 1970

3,497,959
APPARATUS FOR MAKING MEASUREMENTS AND COUNTING ITEMS ON MAPS, DRAWINGS, AND THE LIKE
Coert Engelsman, 106 Garfield Ave., Atlantic Highlands, N.J. 07716
Filed June 9, 1967, Ser. No. 644,838
Int. Cl. G01b 3/12, 7/04; B23q 17/02
U.S. Cl. 33—142
2 Claims

ABSTRACT OF THE DISCLOSURE

The disclosure describes apparatus including a scaling probe with a rotatable wheel for rolling over a sheet from point to point. The wheel is operatively connected to an apertured disk to rotate the same. The disk is scanned by a photoelectric assembly and pulses corresponding to the angular rotation of the disk are applied to a calibrated counter. An adding and marking probe is also provided with a marking tip having a retracting member to actuate a switch in the probe for applying pulses to the calibrated counter.

---

The invention concerns apparatus for measuring distances, lengths or areas on drawings of various scales and for counting quantities of various marked items on plans, maps, drawings, and the like.

The invention involves a scaling probe which signals by means of electrical pulses to an electrically or electronically operable counter through a suitable pulsing circuit. The scaling probe includes a housing in which is a rotatable disk with concentric rings each having equally spaced holes or contact points. These holes or points are scanned by a photoelectric or electromagnetic assembly mounted on an adjustable carrier. The carrier is movable to select any ring of holes or contacts for scanning. For adding purposes, an adding probe is provided. This probe includes a housing in which is a microswitch and a marking device. As each item on a drawing is being marked to indicate it is counted, the marking device retracts and closes the switch to send a pulse to the counter.

It is therefore a principal object of the invention to provide apparatus of the type described, including a scaling probe having a housing supporting a rotating wheel for rolling along a sheet; and a rotatable disk operatively connected by gear means in the housing to the wheel to rotate with the wheel, the disk having concentric rings of spaced holes; and a carrier movable on the housing, the carrier supporting a photoelectric assembly to scan holes in a selected ring so that electrical pulses are sent to an electro-mechanical or electronic counter as the disk rotates.

A further object is to provide a scaling probe as last described, wherein the carrier is rotatably adjustable or longitudinally slidable on the housing.

Another object is to provide a scaling probe as last described, wherein the rotatable wheel is operatively connected to the rotatable disk by a gear train which may include a drive shaft coupling drive and driven gears.

A further object is to provide apparatus of the type described with an adding probe having a retracting marking member and associated switch closed by movement of the marking device to pulse the counter.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a side elevational view of a scaling probe according to the invention, parts being broken away to show internal construction.

FIG. 2 is a longitudinal central sectional view taken on line 2—2 of FIG. 1.

FIG. 3 is a side view of a scale disk.

FIG. 4 is a side elevational view of an adding or counting and marking probe.

FIG. 5 is a longitudinal central sectional view taken on line 5—5 of FIG. 4.

FIG. 6 shows a circuit of an electro-mechanical counter adapted to be used with the probes of FIGS. 1 and 4.

FIG. 7 is a side elevational view of another version of scaling probe.

FIG. 8 is a longitudinal central sectional view taken on line 8—8 of FIG. 7.

FIG. 9 is a cross sectional view taken on line 9—9 of FIG. 7.

FIG. 10 is a side view partially in section of another modified scaling probe employing a drive shaft instead of a gear train.

FIG. 11 is a fragmentary sectional view taken on line 11—11 of FIG. 10.

Referring to the drawings, there is shown in FIGS. 1 and 2 a scaling device 10 having a housing 11 formed with a flat rather round base 12 having a radially extending wall 14. In wall 14 is a shallow recess 16. Overlaying margins 18 of the recess is a plate 20 held on by screws 22. A cavity 23 is formed in the base 12. Overlaying this cavity and part of plate 20 is a cover plate 24 held on by screws 26. Wall 14 is open at its narrow tapered end 25. Disposed in this open end of the wall 14 between the wall and plate 20 is a round wheel 30 rotatably held by a pintle shaft 32. Integral with the wheel is a small spur gear 34. Gear 34 is meshed with a larger gear 35. Gear 35 is one of train of gears 34–41. Gears 35–40 are larger than gears 34, 41, and are all of equal diameter. Gears 35–40 are rotatably mounted by pintle shafts 42 between wall 14 and plate 20. The last large gear 40 is engaged with small gear 41 which is equal in diameter to gear 34. All the gears 34–41 are coplanar and rotate simultaneously when wheel 30 is rotated by rolling it along the surface of a sheet on which measurements are to be made. Thus when wheel 30 and gear 34 rotate one revolution, gear 41 also turns once.

On pintle shaft 44 carrying gear 41 is a round disk 46 made of opaque metal or plastic material. In this disk is a multiplicity of concentric holes 48 arranged in concentric rings 50. The holes are equally spaced in each ring. There are eleven rings or holes as shown best in FIG. 3, but more or less than ten rings or holes can be provided. Shaft 44 is journaled between the bottom of base 12 and the cover plate 24.

The base 12 has a tapered, radial extension 52 diametrally opposite from wall 14. A screw 53 is rotatably disposed in a hole 54 and in base extension 52. The screw engages a nut 55. A carrier 60 is provided for an optical assembly including two axially aligned cylindrical casings 62, 64. The carrier has two walls 65, 66 formed as sectors of circles and joined by integral end or side walls 67. The walls 65, 66 extend about 135° angularly on opposite sides of base 12 and cover 24. Screw 53 extends through walls 65, 66 near the apical line at the joint of walls 67 to engage nut 55, and serves as a pivot to permit turning of the carrier on housing 11. The carrier can be turned through an angle of about 45° by grasping carrier 60.

In cover 24 is a series of holes 70 arranged radially with respect to the center of the cover and spaced apart distances equal to the spacing of rings 50. Another series of holes 72 in the base register with holes 70. In walls 65 and 66 are two holes 73, 74 aligned with each other and alignable with any pair of holes 70, 72 by turning the carrier on housing 11.

In casing 62 is a photoelectric cell 75 aligned with hole 73 to scan holes 48 in disk 46 when the disk rotates. The disk rotates one turn with gear 44 when the wheel 30 and gear 34 rotate one turn. Located in the line of sight of the photoelectric cell is a lamp bulb 76 supported in a socket 78 inside of casing 64. The lighted lamp illuminates the cell through aligned holes 74, 72, 48, 70 and 73 in turn. The lamp is energized via a power supply cord 80 which enters the casing 64 through a grommet 82. From photoelectric cell extends wires 84 which are formed into an electric cord or cable 85 which passes out of casing 62 through grommet 86. A pushbutton, normally open switch 88 having a manually operable button 89 is mounted on side wall 66 of the carrier 60. Wires 90 extend outwardly of the switch 88. The wires 84 and 90 to reset terminate at a pulsing and counting circuit 150 described below and shown in FIG. 6. This circuit is used in cooperation with the scaling probe 10 and adding probe.

In order to determine the proper angular location or orientation of carrier 60 on housing 11, there is provided an index line 95 on the carrier wall 65. This index line can be aligned with any one of index lines 96 on cover plate 24, by turning the carrier 60. Thus the photoelectric cell and lamp can be positioned for scanning the holes in any selected ring. The lines 96 are marked A-K to correspond respectively with the eleven rings of holes 48 of disk 46.

An adding and marking probe 100 shown in FIGS. 4 and 5 is employed for adding or counting items on a sheet and is used in association with circuit 150. Referring now to FIGS. 4 and 5, the probe 100 has an elongated housing 102 in which is a pushbutton microswitch 104. The switch has an operating button 106 to which is connected one end 107 of a shaft 108. This shaft extends out the narrow open end 110 of the housing and terminates in a writing instrument 112 which can be a ball point pen, pencil or the like. This instrument has a marking tip 114. The shaft 108 is axially movable inside the housing in order to close the switch 104 each time pressure is applied to tip 114. Connected to the switch are wires 116 formed as insulated cable or cord 118. On side wall 120 of the housing 102 is a pushbutton switch 122 having a manually operable exposed switch button 124. Insulated wires 125 extend from the switch. Wires 116 and 125 to reset terminate at pulsing and counting circuit 150 shown in FIG. 6 which will now be described.

Circuit 150 is energized by an external alternating current supply via lines 200 connected to a direct reading counter 202 and to a power transformer 204. The counter has a digital scale 206 which indicates the number of pulses applied to the counter after it has been set to zero reading by a pulse applied to electrical reset circuit 210 connected to or forming part of the counter circuit.

Full wave rectifiers 212 are provided to supply power to a transistorized pulse amplifier 216 and to a transistorized one-shot multivibrator 218. Lamp 76 is energized directly by power supplied via secondary winding 220 of transformer 204. When apertured disk 46 of the scaling probe rotates between lamp 76 and photoelectric cell 75, light pulses are applied to the cell through holes in the disk. Electrical pulses are applied to the input of the pulse amplifier 216. The output of the pulse amplifier triggers the multivibrator 218 so that a single pulse is applied to pulse transformer 222 for each signal or wave train put out by amplifier 216. The transformer 222 applies a single rectified pulse to the counter 202 to advance the counter scale 206 one digit. Reset switch 88 applies a pulse of power from line 200 to reset the counter scale to zero after a measurement is made.

In use of the apparatus a measurement is made by rolling wheel 30 of probe 10 from one point to another on a sheet such as a map, drawing, architectural plan, etc. Suppose the scale of the plan is such that one ¼" represents one foot on the plan, and suppose wheel 30 has a circumference of one half inch. Suppose carrier 60 is set so arrow 95 points to index line A, corresponding to the first ring on disk 46 which has two holes. Then each time disk 46 rotates once, all two holes 48 of the first ring will pass photoelectric cell 75. Occurrence of these two pulses will represent one half inch travel of wheel 30, since disk 46 rotates once for each rotation of wheel 30. Thus a reading of "2" on counter scale 206 will represent two feet on the plan. A reading of "20" will represent 20 feet on the plan, etc. on the scale 206.

For scales not represented on the disk, a calibrated chart can easily be made up for correlating readings of scale 206, with rings A-K respectively, for various proportional scales of maps, drawings and plans. This chart will give direct reading in feet, yards, miles, meters, kilometers or whatever units may be desired.

It will be noted in circuit 150 that the adding probe switch 104 is connected to the amplifier input to pulse this amplifier. The multivibrator responds to the amplifier output to advance the counter scale 206 one digit each time switch 104 is closed. The scale 206 is direct reading for counts so that each time the marking tip 114 is pressed down on a point on a sheet to be counted, the counter scale registers one count while the point counted is marked by tip 114 to indicate that it has been counted. After the count is completed the reset switch 122 is closed to reset the counter scale 206 to zero. More than one counter may be hooked up.

FIGS. 7, 8 and 9 show an alternate construction of the scaling probe 10A which has some parts corresponding to those of probe 10 and these parts are identically numbered. In probe 10A the housing 11a is flat. Screws 26a hold cover plate 24a on base 12a. Abutted radial extensions 152, 154 are formed on both the base and cover plates. On these extensions is slidably mounted on a carrier 60a for photoelectric cell 75 and lamp bulb 76. The carrier 60a has a rectangular tubular end 155 slidably fitted on the extensions 152, 154 of the probe to slide longitudinally thereof and radially of the rounded parts of the base and cover plate. The cell 75 and lamp 76 are disposed in compartments 64a formed by outwardly extended parts of the carrier 60a. Reset switch 88 is mounted on the outer end of cover plate extension 154.

Rotatable disk 46a is provided with concentric rings of equally spaced holes 48. Spaced holes 72a in the base are aligned longitudinally of the base. They register with corresponding holes 70a in the cover plate. Light from the lamp passes in turn through one of holes 72a, 48 and 70a to photoelectric cell 75. The disk 46a is rotatably disposed in a cavity 160 formed inside the cover plate. Gear 41a adjacent to and coaxial with disk 46a is driven by a train of five gears 34a-38a. Gear 34a is secured to wheel 30' which extends out the narrow other end of housing 11a. Probe 10a operates in the same manner as already described for probe 10 in conjunction with circuit 150. Scale selection is effected by sliding the carrier longitudinally of the housing. The upper end edge 162 of the carrier moves past index lines 163 and can be stopped at any one of the eleven lines marked A-K to select the desired ring of holes of disk 46a for scanning by the photoelectric cell and lamp.

In FIGS. 10 and 11 is shown another alternate construction of the scaling probe 108 which is generally similar to probe 10 of FIGS. 1-3. Corresponding parts are identically numbered. In probe 1-B, gear 34 is engaged with a gear 35b which carries a bevel ring gear 170. This gear is engaged with a bevel gear 171 mounted on one end of a shaft 172. This shaft is rotatably mounted between base 12b and cover plate 24b. On its other end the shaft carries another bevel gear 174 which is engaged with a bevel ring gear 175 carried by gear 40b. This gear is engaged with gear 41b which is coaxial with and rotates with apertured disk 46b.

The base and cover plate are formed with cavities 176, 177, 178 and 179 in which the several gears, disk and shaft rotate.

Operation of probe 10B is the same as for probe 10 already described. Rolling wheel 30 along a sheet causes disk 46b to rotate once for each rotation of the wheel. The angular setting of carrier 60 will determine which ring of holes 48 is scanned by the photoelectric cell in housing 62.

Although the invention has been described in connection with photoelectric scanning of holes in the disk, it will be apparent that instead of holes, there can be concentric rings of electrical contact elements. Suitable wiper contacts will then be mounted in housings 62, 64 to scan the contacts on the disk. Other types of sensory arrangements can be employed, but in general the photoelectric scanning is preferred because of its reliability, simplicity and economy in manufacture.

What is claimed is:

1. A scaling probe apparatus for measuring distance between two points on a surface comprising a flat elongated housing, a wheel rotatably supported in one end of the housing and extending out of the housing for rolling on and along said surface, a flat circular disk rotatably disposed in the flat housing, gear means operatively connected between the wheel and disk so that the disk and wheel rotate together, transducer means disposed to sense rotation of the disk to produce a number of pulses depending on the extent of the rotation of the disk, means for applying the pulses to a digital indicating electromechanical counter so that the indication of the counter corresponds to the distance said wheel rolls on said surface, switch means carried by the housing for resetting the counter to the zero reading, said circular disk having a multiplicity of holes arranged in concentric rings with a different number of holes equally spaced apart in each ring, a carrier movably mounted upon the housing; said transducer sensing means comprising a lamp and photoelectric cell both supported by the carrier on opposite sides respectively of the housing and arranged to transmit light from the lamp to the cell through holes in any selected ring of holes in the disk, the selection of the ring of holes being determined by the position of the carrier on the housing, said carrier having a pair of walls parallel to opposite sides of the disk, said lamp and cell being mounted in optical alignment with each other on said carrier walls, and means pivotally mounting the carrier to the housing so that the lamp and cell are adjustably positioned radially of the disk for scanning any selected ring of holes thereof.

2. A scaling probe apparatus recited in claim 1, wherein said gear means comprises a first spur gear coaxial with said wheel, a second spur gear equal in diameter to the first gear and coaxial with said disk, and a plurality of other gears of equal diameter meshed with each other and with the first and second gear, so that each time the wheel rotates one turn, the disk rotates one turn.

References Cited

UNITED STATES PATENTS

| 2,294,566 | 9/1942 | Malm et al. |
| 1,877,061 | 9/1932 | Schroll. |
| 3,077,804 | 2/1963 | Manaloris. |

FOREIGN PATENTS

| 23,968 | 10/1910 | Great Britain. |

LEONARD FORMAN, Primary Examiner

STEVEN L. STEPHAN, Assistant Examiner

U.S. Cl. X.R.

33—125, 141; 250—233, 237